May 16, 1933.  S. S. JULIAR  1,909,834

GAUGE ROD CLEANER

Filed July 20, 1932

Inventor
Silas S. Juliar
By Wilkinson & Mawhinney
Attorneys.

Patented May 16, 1933

1,909,834

UNITED STATES PATENT OFFICE

SILAS S. JULIAR, OF GAINESVILLE, FLORIDA

GAUGE ROD CLEANER

Application filed July 20, 1932. Serial No. 623,635.

The present invention relates to improvements in automobile gauge cleaners, and more particularly relates to an accessory to be located in a convenient place beneath the hood of an automobile for the purpose of providing wiping surfaces for the oil gauge rod or bar which extends down into the crank case of the engine.

An object of the invention is to provide a simple and inexpensive cleaning device through which the gauge bar may be quickly and conveniently drawn for the purpose of removing the oil therefrom prior to taking a reading of the depth of the oil in the crank case. In accordance with the present practice, this gauge rod or bar is withdrawn by hand by the attendant at the gasoline service station, and wiped off by a cloth or rag which must be carried about the person of the attendant. This rag becomes soiled and greasy in a very short time owing to the great quantities of oil wiped therefrom during the course of a day.

It is therefore another object of the invention to do away with such dirty and mussy rags which the owner or the attendant has to carry about, and which the service station has to supply.

The invention also contemplates renewable wiping surfaces which may be replaced from time to time as they become saturated with the oil from the gauge bar.

With the foregoing and other objects in view, the invention will be more fully described hereinafter, and will be more particularly pointed out in the claim appended hereto.

In the drawing, wherein like symbols refer to like or corresponding parts throughout the several views, Figure 1 is a perspective view of an improved automobile gauge cleaner constructed in accordance with the present invention.

Figure 1:
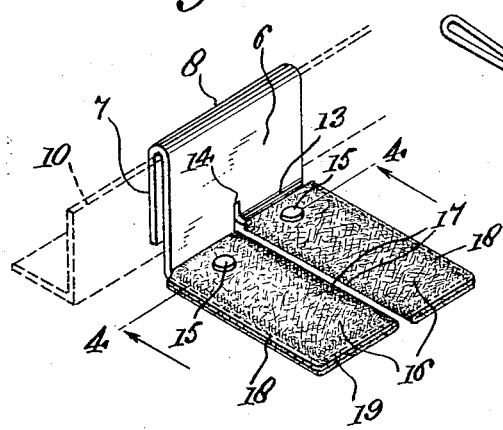

Referring more particularly to the drawing the improved device includes a backing plate 6 forming part of a clamp with the flange 7 which is bent over, as indicated at 8, from the upper portion of the metal backing plate 6. Within the space between the plate 6 and flange 7 project screws 9 which are threaded in the openings made in the flange 7. These, of course, will be threaded openings. The ends and bottom of the space between the plate 6 and flange 7 are open so that the device may be hung over a part of the framework of the automobile as indicated in dotted lines at 10 in Figure 1.

The plate 6 is supported substantially vertically and extending out from the same are a pair of spaced fingers 11 and 12. These fingers may be spaced in any suitable way and the spacing is preferably secured by offsetting one finger vertically in a plane above the other. The fingers, backing plate 6 and flange 7 may all be formed from a single piece of rectangular sheet metal bent at the points 8 and 13 and being incised along a central line 14, thus dividing the two fingers 11 and 12. This incision 14 extends up for a distance into the backing plate 6 in order that one of the fingers 12 may be folded on the plate 6 at a higher hinge line than the lower finger 11.

Figure 5:
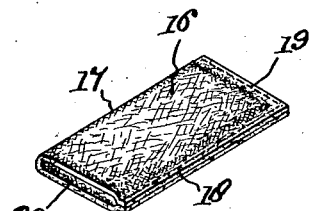
Figure 5 is a perspective view of one of the pads employed.

Both fingers are provided with perforations 14' to receive staples or other fastenings 15 by which the felt or other envelopes 16 are held in place upon the fingers. The envelopes, one of which is shown in Figure 5, are preferably constructed from a piece of felt folded upon the longitudinal line 17. The longitudinal edges are brought together and stitched as indicated at 18. Transversely the overlapped parts are stitched at one end 19, whereby the device is closed on all sides and on one end, but is open at the end 20 for the purpose of slipping over the finger. Preferably the envelopes are so arranged that the stitched edges 18 are outermost and the folded smooth edges 17 are presented toward one another.

Figure 2:
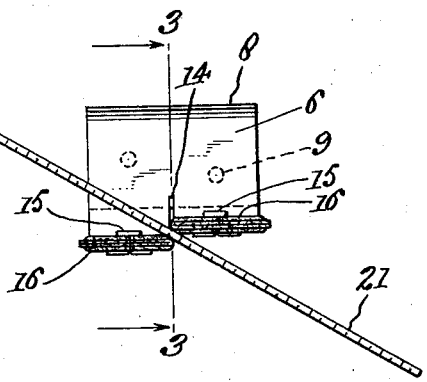
Figure 2 is a front edge view of the same with the gauge bar shown in a position of use.
Figure 3:
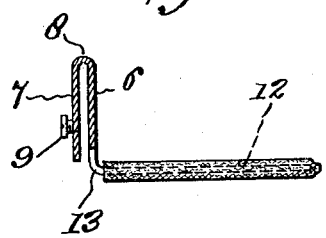
Figure 3 is a longitudinal section taken on the line 3—3 in Figure 2.
Figure 4:
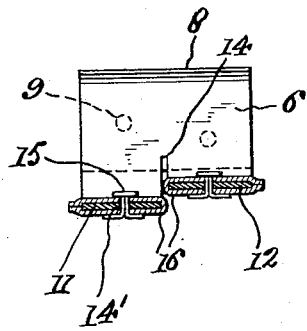
Figure 4 is a cross section taken on the line 4—4 in Figure 1.

In the use of the device an oil gauge rod or bar 21, shown in Figure 2, is withdrawn from the crank case where it reposes at all times. The gauge rod is then inserted in the space between the two felt covered fingers of the device which will be found mounted upon an appropriate part of the framework of the automobile adjacent the engine or upon any other part. By drawing the gauge rod through the fingers the oil will be stripped therefrom and be absorbed by the felt envelopes. The guage rod may then be withdrawn and reinserted in the crank case to thereupon take a reading for the purpose of showing whether the crank case is deficient in oil or not.

The spacing of one finger above another will be superior to the spacing of the fingers horizontally apart, as the former arrangement admits of placing the gauge bar 21 in a diagonal position, as indicated in Figure 1, where more extensive surfaces of the felt are required to come in contact with the gauge bar.

It is to be understood that the felts are interchangeable and cleanable. In drawing the gauge through the fingers of the device, the gauge will preferably be drawn through in a substantially horizontal plane to avoid too much wear on the felts, but pressure may be exerted by raising the gauge from a horizontal to a perpendicular or near perpendicular position.

It is obvious that various changes and modifications may be made in the details of construction and design of the above specifically described embodiment of this invention without departing from the spirit thereof, such changes and modifications being restricted only by the scope of the following claim.

What is claimed is:—

An automobile gauge cleaner comprising a substantially vertical backing plate, said backing plate having a vertical incision, fingers bent from opposite sides of said incision at approximately right angles to said backing plate, the incision extending partly into the backing plate, one finger being bent on a higher hinge line than the other finger, and felt envelopes slipped over the fingers.

SILAS S. JULIAR.